(12) United States Patent
Marc

(10) Patent No.: US 10,436,239 B2
(45) Date of Patent: *Oct. 8, 2019

(54) SELF-LOCKING SEALING DEVICE

(71) Applicant: JPB Systeme, Montereau sur le Jard (FR)

(72) Inventor: Damien Marc, Nangis (FR)

(73) Assignee: JPB Système, Montereau sur le Jard (FR)

( * ) Notice: Subject to any disclaimer, the term of this patent is extended or adjusted under 35 U.S.C. 154(b) by 150 days.

This patent is subject to a terminal disclaimer.

(21) Appl. No.: 15/437,045

(22) Filed: Feb. 20, 2017

(65) Prior Publication Data

US 2017/0198741 A1    Jul. 13, 2017

Related U.S. Application Data

(63) Continuation-in-part of application No. 14/033,975, filed on Sep. 23, 2013, now Pat. No. 9,574,599, which (Continued)

(51) Int. Cl.
*F16B 39/32* (2006.01)
*F16B 39/22* (2006.01)
(Continued)

(52) U.S. Cl.
CPC ............. *F16B 39/22* (2013.01); *B64F 5/60* (2017.01); *F16B 39/24* (2013.01); *F16B 39/26* (2013.01)

(58) Field of Classification Search
CPC .......... F16B 39/32; F16B 39/26; F16B 39/28; F16B 39/22
(Continued)

(56) References Cited

U.S. PATENT DOCUMENTS 853,133 A   5/1907 Smith
1,066,761 A * 7/1913 Semon ................... F16B 39/24
                                                   411/138
(Continued)

FOREIGN PATENT DOCUMENTS

FR      2857080 A1    1/2005
FR      2952149 A1    5/2011
(Continued)

OTHER PUBLICATIONS

European Patent Office; Search Report in European Patent Application No. 14184873.9 dated Jan. 26, 2015; 6 pages.
(Continued)

*Primary Examiner* — Flemming Saether
(74) *Attorney, Agent, or Firm* — Dorton & Willis, LLP

(57) ABSTRACT

A sealing device in the form of a plug that is receivable in a threaded hole of a case includes a threaded central body, a skirt connected to the central body, and locking/unlocking means that opposes spontaneous unscrewing of the plug and is automatically activated by rotation of the plug and corresponding movement along an axis. The locking/unlocking means includes a first releasable coupling component coupled for rotation with the central body, and a second releasable coupling component facing the first coupling component at least during screwing and unscrewing. In at least in a tightened condition of the plug, the second coupling component is secured against rotation relative to the case by rotation restricting means located inside the threaded bore. In the screwed condition, an annular end face of the skirt bears against a bearing face of the second releasable coupling component to transmit tightening thrust to the case.

32 Claims, 4 Drawing Sheets

Related U.S. Application Data is a continuation-in-part of application No. PCT/FR2012/050463, filed on Mar. 6, 2012.

(51) Int. Cl.
*B64F 5/60* (2017.01)
*F16B 39/24* (2006.01)
*F16B 39/26* (2006.01)

(58) Field of Classification Search
USPC ........ 411/132, 134, 135, 136, 141, 143–146, 411/326–332, 322, 221, 6, 7
See application file for complete search history.

(56) References Cited

U.S. PATENT DOCUMENTS

| | | | |
|---|---|---|---|
| 1,377,397 A * | 5/1921 | Chance | F16B 39/32 411/138 |
| 1,646,805 A | 10/1927 | Bell | |
| 3,282,316 A | 11/1966 | Griswold | |
| 3,942,570 A | 3/1976 | Bochman, Jr. et al. | |
| 4,571,452 A * | 2/1986 | Giubileo | H02G 15/04 174/77 R |
| 4,790,703 A | 12/1988 | Wing | |
| 4,971,501 A | 11/1990 | Chavez | |
| 5,013,197 A | 5/1991 | Allaert et al. | |
| 5,362,110 A | 11/1994 | Bynum | |
| 5,533,849 A | 7/1996 | Burdick | |
| 5,642,972 A * | 7/1997 | Ellis | F16B 39/28 411/352 |
| 5,823,702 A | 10/1998 | Bynum | |
| 5,897,277 A | 4/1999 | Barre et al. | |
| 7,883,117 B2 | 2/2011 | Marc et al. | |
| 8,540,470 B2 | 9/2013 | Dillon et al. | |
| 9,022,709 B2 | 5/2015 | Benzing | |
| 9,574,599 B2 * | 2/2017 | Marc | F01D 21/003 |
| 2008/0050199 A1 * | 2/2008 | Park | F16B 4/004 411/402 |
| 2015/0063939 A1 | 3/2015 | Marc | |

FOREIGN PATENT DOCUMENTS

| | | |
|---|---|---|
| JP | S616418 A | 1/1986 |
| JP | H0979247 A | 3/1997 |
| SU | 916792 A1 | 3/1982 |
| WO | 9602766 A1 | 2/1996 |
| WO | 96014516 A1 | 5/1996 |
| WO | 2012127146 A1 | 9/2012 |

OTHER PUBLICATIONS

Japanese Patent Office; Office Action in Japanese Patent Application No. 2014-500440 dated Feb. 2, 2016; 7 pages.
European Patent Office; Search Report in International Patent Application No. PCT/FR2012/050463 dated Jun. 5, 2012; 6 pages.
JPB Systeme; Internet You Tube Video entitled "Self locking Borescope Plug—Bouchon endoscope auto-freiné"; www.youtube.com/watch?v=PrryILyV9c; Feb. 19, 2009.

* cited by examiner

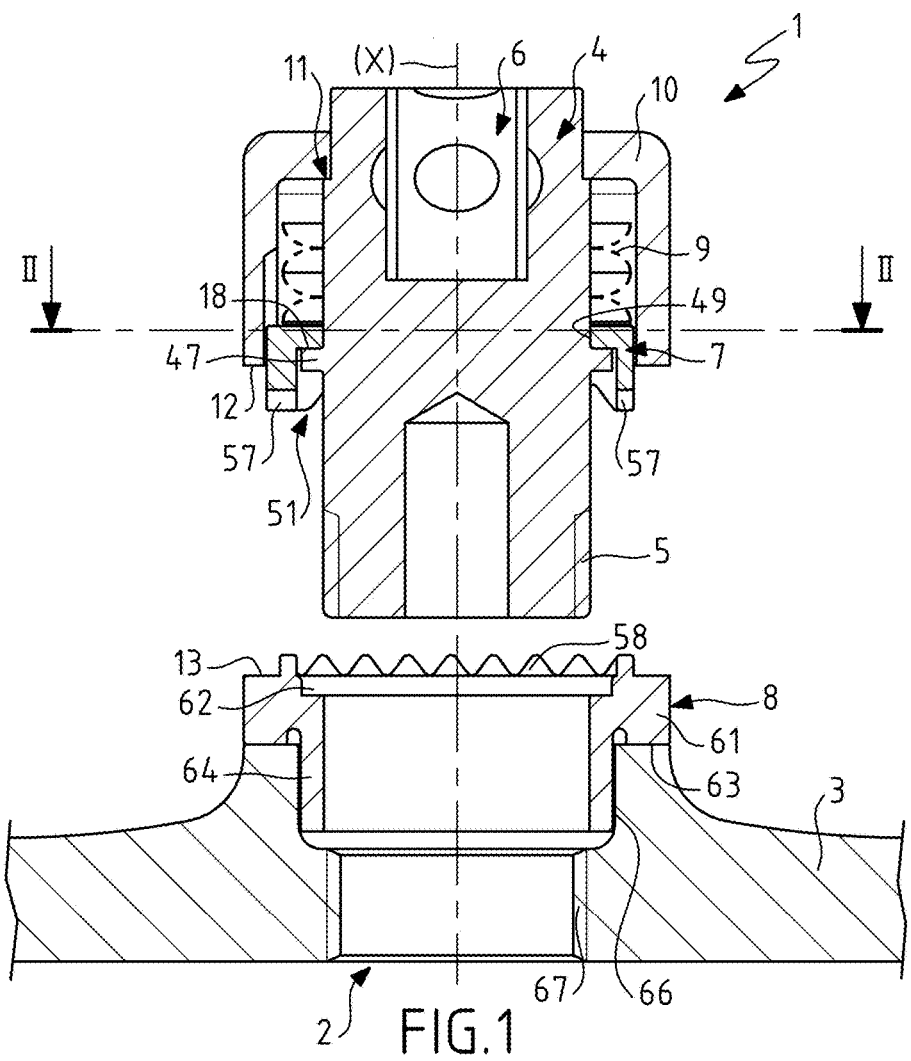
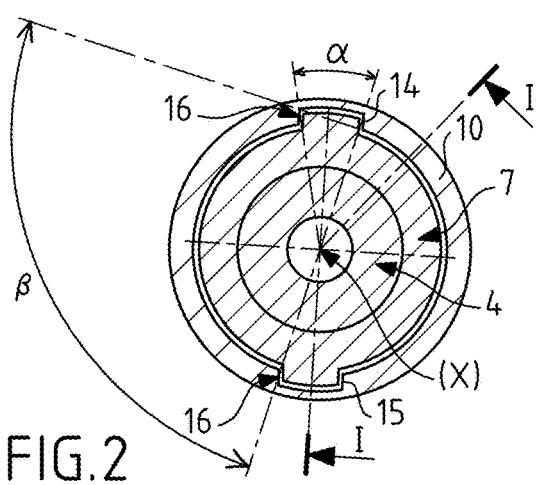 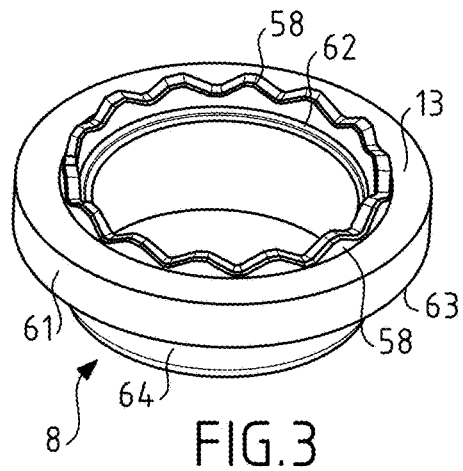

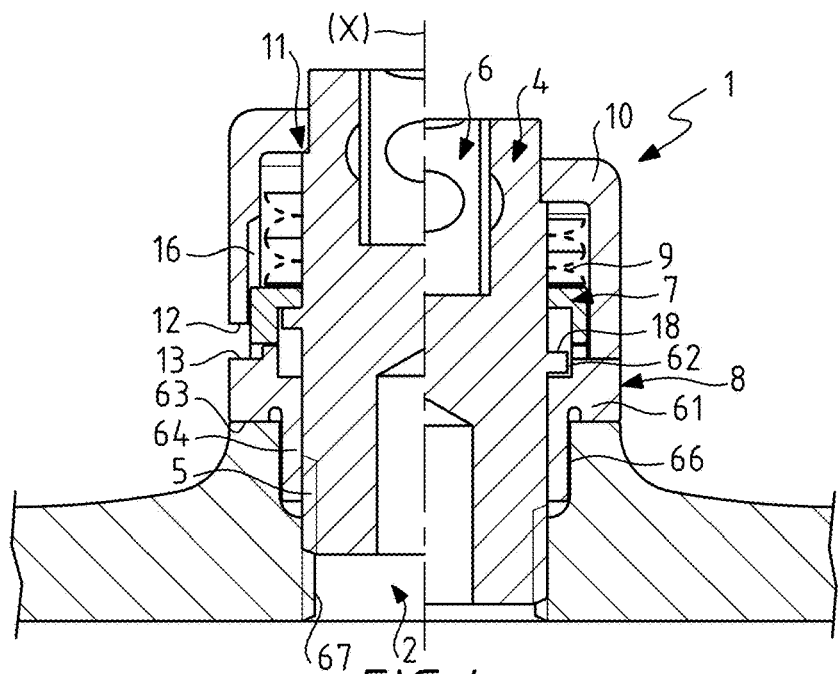
FIG.4
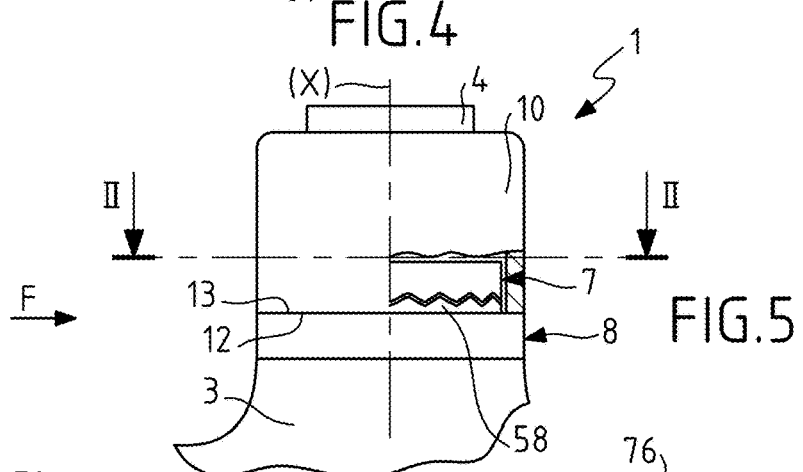
FIG.5
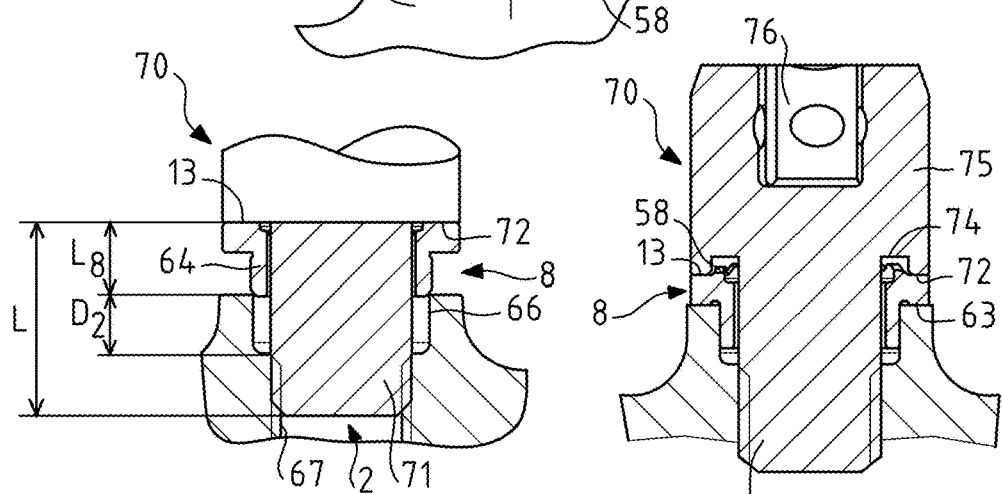
FIG.6
FIG.7

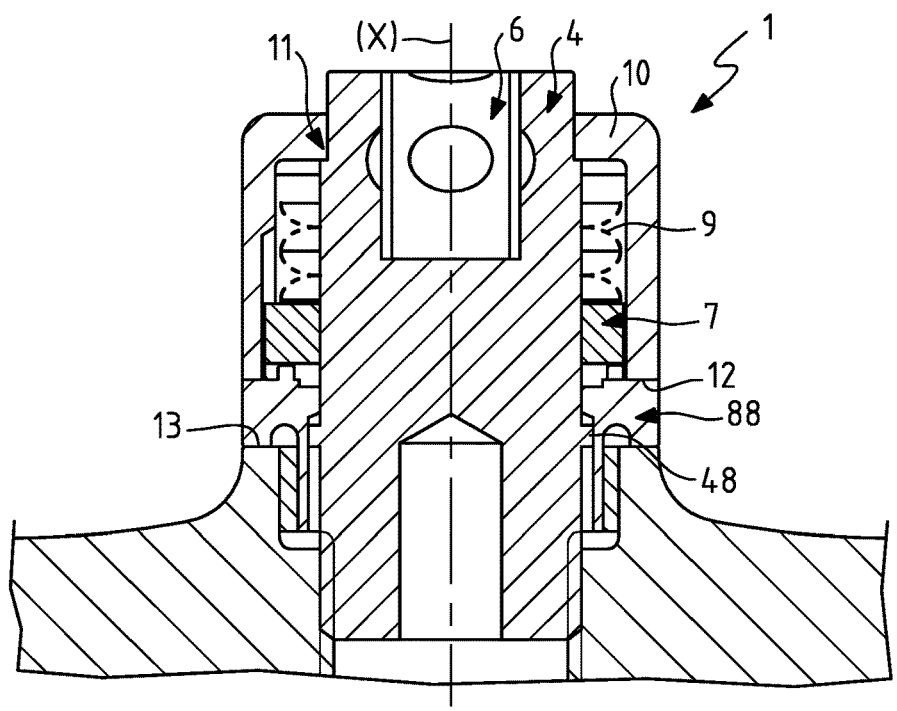
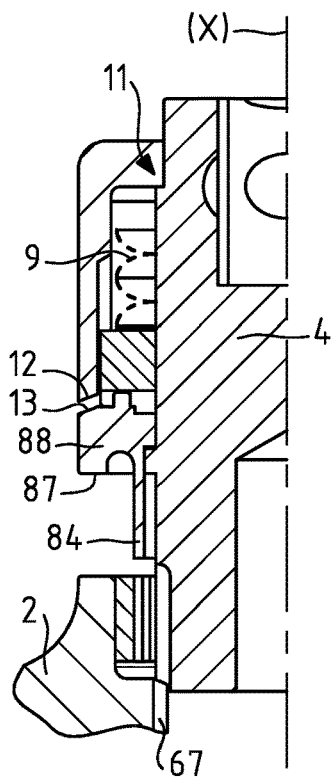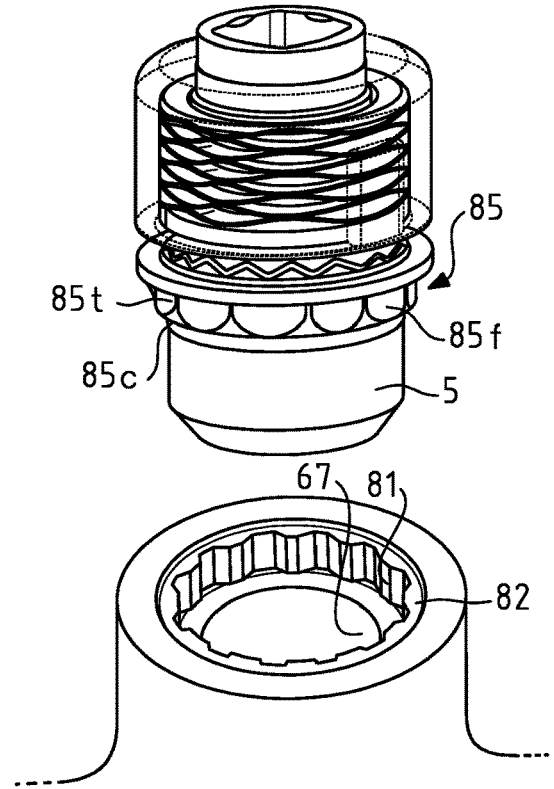

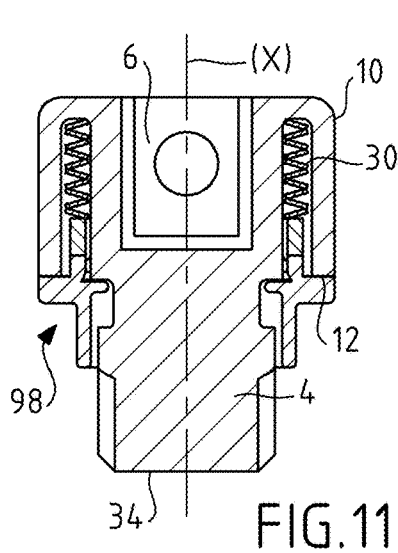
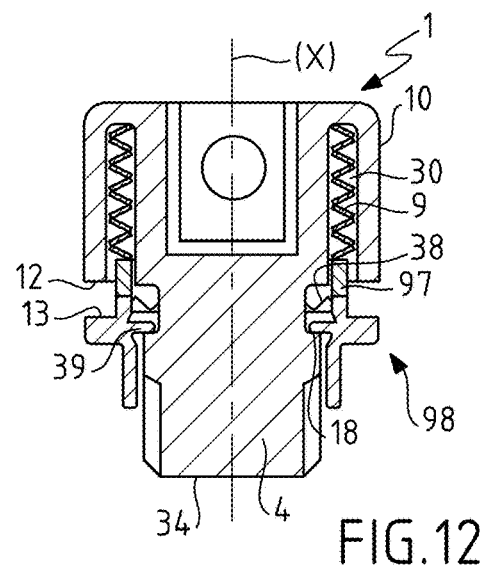
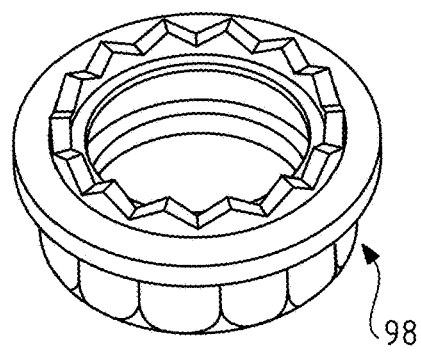
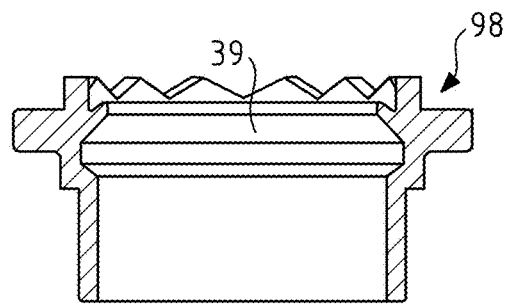
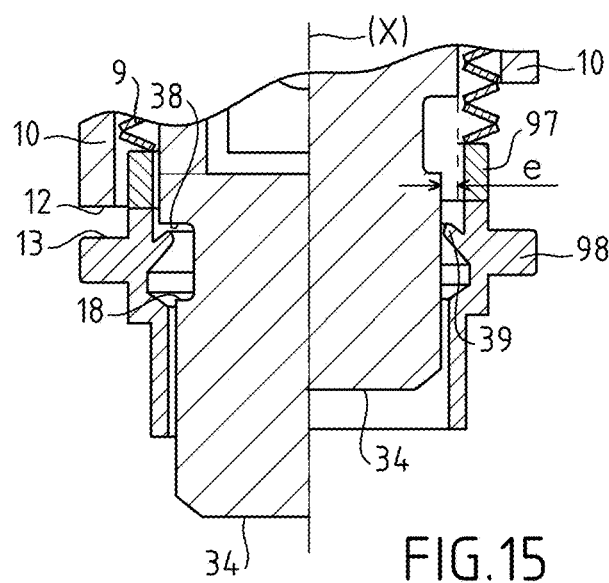

SELF-LOCKING SEALING DEVICE

CROSS-REFERENCE

This application is a continuation-in-part of U.S. patent application Ser. No. 14/033,975, filed Sep. 23, 2013 (pending), which claims priority to national phase application under 35 U.S.C. § 371 of International Patent Application No. PCT/FR2012/050463, filed Mar. 6, 2012 (expired), which claims the benefit of French Patent Application No. 1152310 filed Mar. 21, 2011, the disclosures of which are incorporated by reference herein in their entirety.

TECHNICAL FIELD

The present invention relates to a plug-type sealing device the screwing of which allows automatic locking, preventing spontaneous or untimely unscrewing.

BACKGROUND

In aviation, an aeroplane engine requires regular maintenance and a very rigorous inspection regime in order to ensure total reliability of the engine in operation. So that the internal parts as well as any wear thereof can be monitored, holes are provided in the engine case. During maintenance operations, a plug sealing the hole is unscrewed and a borescope can be inserted to probe the internal voids and inspect the condition of the engine parts. This avoids opening the case and completely dismantling the engine.

The commonly used plugs of this type, also called "borescope plugs", have a screw thread and are screwed into a corresponding thread in the case, using a torque wrench. When the engine runs, its operation generates vibration capable of causing screwed parts, and more particularly the borescope plugs, to loosen.

Various means for avoiding such a fault are known. These means can consist of placing an insert in contact with the plug, before or after tightening. The parts used are of the lock washer type, or the split pin or lockwire type.

However, the plugs in an engine can be poorly accessible, because tubing and other peripheral components occupy the space around the case. Thus, installing an additional braking or locking part onto a plug requires great dexterity, and even luck, to avoid losing said part. In some cases, the plug is only accessible using a long tool, any direct manual access to the plug being impossible when the plug is in place. A plug equipped with a braking system dealing with this type of problem is also known from document PCT/FR95/01461. Such a system comprises locking and unlocking means that are automatically activated by the rotation of the plug and its longitudinal movement along the axis of rotation. The locking and unlocking means are constituted by two rings (or cups) each comprising a series of teeth directed axially towards the other ring. The teeth have a pointed (or triangular) profile and mesh together during the axial movement of the plug. One of the rings is fixed on the case, in the document press-fitted onto the case so as to be immobilized against rotation with respect to the case. The other ring is incorporated into the plug and driven in rotation therewith when the plug is being screwed into the hole in the case. This known plug requires the fitting of a ring onto the case, by press-fitting. This operation requires a special tool equipment.

It is noted particularly that the coupling for common rotation of one of the rings with the central body of the plug is obtained by mutually corresponding configurations made on the one hand on the ring and on the other hand on the central body of the plug. In the device described in said document, the ring comprises pins entering axially with respect to the direction of screwing into corresponding grooves configured on the central body of the plug, said pins being movable along said longitudinal axis. In a variant, similar devices are known in which the ring is directly coupled for common rotation with the central body by a system of flat sections. These systems all require specific machining of the central body, which can in certain cases weaken it mechanically and/or be unsuitable in terms of achieving a compact (small space requirement) and optimized plug.

The sealing devices of the type discussed are often exposed to severe operating conditions, such as extreme temperatures, moisture, dust etc., and are nevertheless expected to have the same lifetime as the equipment, typically an aircraft, on which they are mounted, i.e. 20 years or more, corresponding to several tens of screwing and unscrewing operations. The above-discussed sliding arrangements of the ring may sometimes become detrimentally frictional over the time.

In certain known sealing devices, the plug head has a face adapted to transmit tightening thrust to a bearing zone of the case when the plug is in its tightened condition in the threaded hole of the case. This however generates a frictional contact of the plug against the case around the threaded hole at the end of screwing and at the beginning of unscrewing. This may locally damage the case generally made of a relatively delicate alloy.

SUMMARY

The purpose of the present invention is to propose an optimized variant of the plug as described previously, responding even more effectively to the need to prevent untimely unscrewing while simplifying the manufacturing and assembly constraints of the plug. The purpose of the invention is therefore also to propose a sealing device comprising a stopping system opposing any untimely unscrewing under the effect of the vibrations produced particularly by an aeroplane engine, which remains reliable after long years of service.

Another purpose of the present invention is to allow an end face of the plug head to transmit tightening force to the case without this resulting in a risk of damaging the case around the threaded hole.

A further purpose of the present invention is to simplify the installation of an annular coupling component at the entrance of the threaded hole provided in the case.

According to a first aspect of the present invention, there is provided a sealing device comprising a plug intended to be placed in a threaded hole in a case, or removed therefrom, respectively by screwing and unscrewing, the sealing device comprising:

a central body of the plug, provided with a screw thread, a skirt rigidly connected to the central body and having an annular end-face capable of transmitting tightening thrust to the case, locking and unlocking means opposing spontaneous unscrewing of the plug, automatically activated by the rotation of the plug and its corresponding movement in the direction of screwing along a longitudinal axis, said locking and unlocking means comprising:

a first releasable coupling component coupled for common rotation with the central body via guide means configured on the periphery of the first component and extending radially with respect to said longitudinal axis, said guide means entering respectively corresponding grooves configured inside the skirt, which extend parallel to the longitudinal axis so as to allow axial displacement of the first coupling component inside the skirt; and a second releasable coupling component in a position facing the first releasable coupling component at least during screwing and unscrewing, wherein at least in the tightened condition of the plug the second coupling component is secured against rotation with respect to the case by rotation restricting means located inside the threaded bore, wherein in the screwed condition the annular end face of the skirt bears against a bearing face of the second releasable coupling component to transmit tightening thrust to the case.

This arrangement is particularly compact, suppresses frictional contact between the plug and the case, and only requires that the casing be provided with a threaded bore having a widened hole-mouth. The guiding means operative between the first coupling component and the skirt have proven be very reliable even after numerous screwing and unscrewing operations during tests.

In a preferred embodiment, the guide means are constituted by at least two protrusions angularly distributed on the periphery of the first component, about the longitudinal axis, each protrusion being delimited, on the one hand radially by a cylindrical outer profile having a diameter greater than the generally cylindrical outer surface of the first component, and on the other hand angularly by longitudinal edges inscribed within planes forming an angular sector, typically with an angle of between 10 and 45 degrees, about the longitudinal axis. The radial height of the protrusions with respect to the longitudinal axis is preferably greater than 1 mm.

In an advantageous embodiment, the first coupling component and the second coupling component comprise respective sets of teeth intended to engage each other during screwing/unscrewing, said teeth having inclined lateral faces.

In one embodiment, the central body comprises a rotary drive configuration for driving said plug in rotation using a tool for screwing/unscrewing. Alternatively the rotary drive configuration may be provided on the skirt which may then, for this purpose, be extended beyond the central body on the side remote from the screw thread and define the drive configuration inside the skirt beyond the central body.

Said second coupling component may comprise an annular body having a rear face adapted to rest against the case around the threaded hole. In an embodiment, a front face of the second coupling component is provided with second coupling formations and with said annular bearing face for the free end of the skirt, said bearing face surrounding said second coupling formations. In another or the same embodiment, a tubular extension is provided radially inside said rear face and projects beyond the rear face, said tubular extension being adapted for insertion within a widened hole-mouth of the threaded hole for rotation restricting cooperation therein.

Resilient return means, preferably a flat wire wave compression spring, may be provided within the skirt thereby to urge the first coupling component axially towards outside the skirt, and towards the second coupling component at least when the central body of the plug threadingly engages the threaded hole. The central body can then comprise an axial stop, typically a collar machined on the central body, and against which the first coupling component abuts at a distal extremity of a stroke of said first component, under the force of the resilient return means.

In an axially compact embodiment, the first coupling component has a front face provided with first coupling formations surrounding an annular recess adapted to accommodate the distal axial stop when the first coupling component abuts the distal axial stop.

The above mentioned rotation restricting means may be means securing a tubular extension of the second coupling component within a widened hole-mouth of the threaded hole, e.g. by force-fitting.

In an alternative, instead of being permanently secured within the hole-mouth of the threaded hole, the second releasable coupling component can be captive on the central body. Said threaded hole is provided with a widened hole-mouth having as said rotation restricting means an inner side-wall provided with peripherally distributed hole-mouth clutch formations, and said second coupling component has a tubular extension with an outer peripheral wall provided with extension clutch formations complementary of said hole-mouth clutch formations, said tubular extension adapted to penetrate said hole-mouth with mutual clutching of said clutch formations thereby to clutch said second coupling component against rotation with respect to said case at least when said plug is in the tightened condition in the threaded hole. Thus in this embodiment the locking operation comprises two releasable mechanical connections in series, the mutual locking of the locking components and the mutual clutching of the tubular extension with the hole-mouth. Typically the hole-mouth clutch formations belong to a (often pre-existing) insert force-fitted within the hole-mouth.

In the tightened condition the second releasable coupling component preferably bears against the case radially beyond the annular insert to transmit tightening thrust from the skirt to the case.

In the embodiments wherein the second coupling component is captive on the central body, the central body may comprise a distal axial stop against which the second component abuts at a distal extremity of a stroke of said second component, under the force of the first component being resiliently biased in the axial direction towards outside the skirt.

According to an improvement, the second coupling component captive on the central body has a central bore provided with a catch, preferably a plastically deformable lip, and is mounted by an insertion of said screw thread through said bore followed by a displacement of said catch into a retaining position in which said catch precludes reverse movement of said screw thread out of said bore.

Preferably said displacement of said catch is produced on termination of said insertion by an abutment of said catch against a proximal stop which is fast with said central body, said displacement being in one embodiment limited by said second coupling component abutting said annular end-face of said skirt.

An embodiment is proposed in which an annular chamber is formed between said skirt and said central body and encloses said first coupling component and resilient return means urging said first coupling component towards said second coupling component, and wherein said second coupling component sealingly closes said chamber when said catch abuts said proximal stop along an annular abutment line and said annular end face abuts said bearing zone of the second coupling component along an annular bearing line.

The mounting of the second coupling component with the catch as proposed herein above allows that said central body and said skirt be obtained from a single piece of metal, because there is no longer a need of first passing the rear end of the central body through the first coupling component before securing together the rear end of the central body and the skirt.

According to a second aspect of the present invention, there is provided a method of producing a sealing device comprising a plug intended to be placed in a threaded hole in a case, or removed therefrom, respectively by screwing and unscrewing, the threaded hole being provided with a widened hole-mouth with a thread of the threaded hole being provided beyond the hole-mouth with respect to the screwing direction, the plug comprising:

a central body provided with a screw thread, a skirt rigidly connected to the central body and having an annular end face capable of transmitting tightening thrust to the case, a first releasable coupling component provided with first coupling formations and coupled for common rotation with the central body and axial displacement with respect to the central body, preferably via guide means configured on the periphery of the first component and extending radially with respect to said longitudinal axis, said guide means entering respectively corresponding grooves configured inside the skirt, which extend along the longitudinal axis so as to allow axial displacement of the first component inside the skirt, the method comprising the step of force-fitting in the hole-mouth a second coupling component provided with second coupling formations complementary of the first coupling formations, by exerting an axial thrust on a bearing zone provided on the second coupling component radially outside the second coupling formations, by use of a force-fitting means threadingly engaging the thread of the threaded hole.

The method takes advantage of the presence of the bearing zone on the second coupling component as thrust zone for force fitting the second coupling component in the case in a manner allowing to avoid engaging the second coupling formations during said force-fitting. Also, the threading of the threaded hole is used as a convenient means for contributing to generation of the force fitting thrust. The force-fitting does not need to be very strong, so this kind of generation of the thrust does not expose the case threading to a risk of damage.

The force-fitting means may the plug itself, with the annular end face of its skirt engaging the bearing zone of the second coupling component.

Alternatively, said force-fitting means may be a tool having a threaded shaft for engaging the thread of the threaded hole, a head having a thrust face for engaging said bearing zone of the second coupling component, and a rotary drive formation for being driven in rotation by a rotary drive means.

According to an advantageous option, the tool has an annular recess radially inside the thrust face to accommodate the second coupling formations while the thrust face bears on the bearing zone of the second coupling component. This more efficiently protects the coupling formations during insertion of the second coupling component.

BRIEF DESCRIPTION OF THE DRAWINGS

Other features and advantages of the invention will become apparent from the following description of embodiments of the invention which are in no way limitative, and the attached drawings, in which:

FIG. 1 is a cross-sectional view of a first embodiment of a sealing device according to the invention, the plug and the threaded hole being in a separated condition;

FIG. 2 is a cross-sectional view of the plug along line II-II of FIG. 1;

FIG. 3 is a perspective view of the second coupling component of the embodiment of FIG. 1;

FIG. 4 is a cross-sectional view of the first embodiment, the left part showing the plug partly screwed and the right part showing the plug in the tightened condition in the threaded hole;

FIG. 5 is an elevation of the sealing device in the tightened condition, part of the skirt being torn away to show the engaged coupling formations;

FIG. 6 is a schematic cross-sectional part-view illustrating the method step of force-fitting the second coupling component in the hole-mouth of the case;

FIG. 7 is similar to FIG. 6 but at the end of insertion and with the tool fully represented;

FIG. 8 is a cross-sectional view of a second embodiment of the invention, in the tightened condition of the plug;

FIG. 9 is a cross-sectional half-view of the second embodiment, as the threaded central body starts engaging the threads of the threaded hole;

FIG. 10 is a perspective, partly transparent view of the second embodiment, in the separated condition;

FIGS. 11 and 12 are cross-sectional views of a third embodiment of the plug, in the tightened and in the untightened condition, respectively;

FIG. 13 is a perspective view of the second coupling component of the third embodiment;

FIG. 14 is a cross-sectional view of the second coupling component with the catch in its retracted position; and FIG. 15 is a cross-sectional view of the plug, made of two half-views at two different stages of assembly of the plug.

DETAILED DESCRIPTION

As these embodiments are in no way limitative, it is possible in particular to envisage variants of the invention comprising only a selection of features described below, in isolation from the other features described, if said selection of features is sufficient to confer a technical advantage or to differentiate the invention with respect to the state of the prior art. Said selection comprises at least one, preferably functional, feature without structural details, or with only some of the structural details if this part only is sufficient to confer a technical advantage or to differentiate the invention with respect to the state of the prior art.

A first embodiment of the invention will now be described with reference to FIGS. 1 to 7.

According to the invention, the sealing device comprises a plug 1 intended to be placed in a threaded hole 2 of a case 3 (partly shown), or removed therefrom, respectively by screwing and unscrewing. For example, the threaded hole 2 is formed in a boss on the case 3 of an engine. The plug 1 comprises a central body 4 having the general form of a shaft, provided at one end with a screw thread 5, and at the opposite end with a rotary drive recess or configuration 6 for driving the central body 4 in rotation using a tool for screwing/unscrewing (not shown). In the example shown, the rotary drive configuration is a 4-sided female portion intended to receive a corresponding 4-sided male wrench for screwing and unscrewing. Alternatively (not shown), the rotation drive configuration can be e.g. a hexagonal female portion intended to receive a corresponding male hexagonal wrench for screwing and unscrewing. A predetermined tightening torque can be ensured by using a torque wrench. In a variant (not shown), provision can be made for said portion to be replaced by a male configuration on the outside of the central body 4. The screw threads of the threaded hole 2 and of the central body 4 are standard and in particular do not comprise any interruption such as an axial groove or a flat section.

The sealing device also comprises locking and unlocking means opposing the spontaneous unscrewing of the plug 1, activated automatically by the rotation of the plug 1 and its corresponding movement in the direction of screwing along a longitudinal axis (X). During the movement of the plug to the closed—or tightened—position, the locking and unlocking means are brought progressively into action, concomitantly with the movement, without any intervention by the operator. During movement of the plug 1 from the tightened condition, the locking and unlocking means automatically unlock the plug 1 due to the sole fact that a sufficient torque is applied in a sufficiently continuous manner in the unscrewing direction until unlocking is completed. The locking and unlocking means comprise two releasable coupling components: a first component 7 arranged around the central body 4 is coupled for common rotation with the plug 1 and a second component 8 is secured to the case 3 in a widened hole-mouth 66 of the threaded hole 2. Preferably, these coupling means are of the reversible detent type. By "reversible detent" is meant a detent capable of being released by application of sufficient force on the plug in the direction of screwing or unscrewing.

The first and second components 7, 8 each comprise a coupling formation, in the embodiment a toothed profile 57, 58 directed towards the opposite component. In an embodiment the teeth are configured on respective annular front faces of the first 7 and second 8 coupling components opposite each other. In order to avoid unintentional loosening by vibration and allow intentional loosening of the plug by the operator, the toothed profile of the first component 7 is applied via a spring 9 against the identical toothed profile of the second component 8. This results in meshing of the teeth, which opposes the spontaneous rotation of the plug 1.

Moreover, during assembly or disassembly, the operator feels the click-click operation of the device, and can therefore be satisfied with the correct operation of the locking system.

The plug 1 comprises a cylindrical protective skirt 10 rigidly connected to the central body 4. Said skirt 10 is typically press-fitted/crimped onto the central body 4 at the end thereof comprising the rotary drive configuration 6, up to a positioning and locking shoulder 11 configured on the external periphery of the central body 4. By the term "rigidly connected" is meant that the skirt fits perfectly over the central body, without any degree of freedom. In a variant embodiment of the invention (not shown), the skirt can also be welded onto the central body. More generally, the skirt 10 is permanently and rigidly secured to the central body 4.

The skirt comprises a planar annular free end 12, extending in a plane perpendicular to the longitudinal axis X and capable of cooperating directly in abutment with a corresponding planar annular bearing zone 13 of the second component 8. The first component 7 is coupled for common rotation with the central body 4 via the skirt 10. To this end, guide means 14, 15 are configured on the periphery of the first component 7 and extend radially outwardly with respect to the longitudinal axis X. Said guide means 14, 15 enter grooves 16 that have a corresponding shape and are formed on the inside of the skirt 10. The grooves 16 extend parallel to the longitudinal axis X so as to allow displacement of the first component 7 on the inside of the skirt, along the longitudinal axis X with respect to the central body 4 and the skirt 10. Consequently, the first component 7 is also called a "movable part" or "movable cup" owing to its degree of freedom along the axis X. It is noted that the first component 7 has the general shape of a cup, ring, or hoop.

The guide means 14, 15 are constituted by at least two protrusions angularly distributed on the periphery of the first component 7, each protrusion being delimited, on the one hand radially by a cylindrical outer profile having a diameter greater than the generally cylindrical outer surface of the first component 7, and on the other hand angularly, by longitudinal edges inscribed within planes forming an angular sector about the longitudinal axis X. Said angular sector delimiting the protrusions on the guide means has an angle α typically comprised between 10 and 45 degrees, for example 30 degrees as shown in FIG. 2. The height of said protrusions, considered radially with respect to the longitudinal axis X, is preferably greater than 1 mm, and is for example comprised between 1 and 5 mm. The forces transmitted from the skirt 10 to said guide means 14, 15 (as a result of a torque applied to the central body 4 during screwing or unscrewing) are very advantageously directed along tangents to the first component 7, so that no radial component is induced during screwing/unscrewing. In the example shown in FIG. 2, two diametrically opposed guide means are provided. In this case, an angle β□□typically 90 degrees, is observed between the directly stressed longitudinal edges, whether on screwing or on unscrewing. In variant embodiments of the invention (not shown), provision can be made for more than two guide means, for example three guide means angularly distributed about the longitudinal axis X.

The first component 7 is movable in translation with respect to the central body 4 between an axial stop 18 and an inner base of the skirt 10. The first component 7 is axially biased towards the second component 8, towards the opening of the skirt 10, away from the inner base, and towards engagement with the axial stop 18 under the influence of the compression spring 9 positioned around the central body 4. In the example shown, said axial stop 18 is constituted by one shoulder face of a collar 47 machined on the periphery of the central body 4, against which an inner shoulder 49 of the first component abuts. In a variant (not shown), provision can be made for the collar to be replaced by a resilient ring, snap-fitted in a peripheral groove of the central body.

The inner shoulder 49 is the bottom of an annular recess 51 of the first coupling component 7, surrounded by a cylindrical wall terminated by the teeth 57 of the first coupling component 7. When the plug 1 is in its separated condition from the threaded hole 2 (FIG. 1), the first coupling component 7 abuts the shoulder 18 of the collar 47 and the collar 47 is accommodated within the recess 51.

The generally annular second coupling component 8 comprises an annular body 61 having a front face essentially comprising the bearing zone 13 surrounding the coupling teeth 58 which axially protrude therefrom. Radially inside the teeth 58, the annular body 61 is provided with an annular recess 62 opening forwardly and radially inwardly, accommodating the collar 47 when the plug 1 is in the tightened condition in the threaded hole 2 (right part of FIG. 4).

The body 61 has a rear face 63 resting against a corresponding planar annular face of the case around the threaded hole 2. The second coupling component 8 further comprises a tubular extension 64 surrounded by the rear face 63 and projecting axially rearwardly therefrom. Said tubular extension is tightly inserted within a cylindrical hole-mouth 66 of the threaded hole 2. The inner diameter of the tubular extension 64 is somewhat greater than an external diameter of the central body 4 thereby to allow axial and rotational movement of the central body 4 while preferably providing some centring function for the central body 4, especially on or just before initial engagement of the threads of the central body 4 with those of the threaded hole 2. The thread 67 of the threaded hole 2 is formed axially beyond the widened hole-mouth 66 with respect to the screwing direction.

For closing and sealing the threaded hole 2 by means of the plug 1, the central body 4 is screwed into the threads 67 of the threaded hole. Initially, the teeth 57 and 58 are axially apart from each other. At a certain stage (left part of FIG. 4), the teeth 57 and 58 begin to mutually engage. Additional movement of the central body 4 towards the case along the longitudinal axis X during screwing causes the respective sets of teeth 57 and 58 of the first 7 and second 8 components to mesh together intermittently. During the relative rotation between the two groups of teeth, the latter are alternately in a meshing configuration and a tip-to-tip configuration, the change from one configuration to the other being carried out by relative sliding of the respective adjacent faces of the two groups of teeth. The first component 7 therefore carries out axial reciprocations along the longitudinal axis X, inside the skirt 10, towards the rear (recess 6) and towards the front (threaded hole 2) during the screwing of the plug, which is similar to an oscillation movement. Each translation takes place over a stroke corresponding to the height of the teeth, the distance separating the tip of a tooth from the hollow between two teeth, as measured along the longitudinal axis X. It is noted that the teeth preferably have a symmetrical profile, i.e. identical inclinations of the sliding surfaces acting on tightening or loosening, in order to optimize the life of the system and better control the coefficients of friction. A suitable symmetrical tooth profile has for example inclinations of 30 degrees/30 degrees on either side of each tooth with respect to a plane perpendicular to the longitudinal axis X. In another embodiment (not shown), the teeth can have an asymmetrical profile, particularly to give a coefficient of friction that is greater in one direction than in the other. A suitable asymmetrical tooth profile has for example inclinations of 30 degrees/60 degrees on either side of each tooth.

The tightened condition is reached when the free end face 12 of the skirt 10 abuts the bearing zone 13 of the second coupling component 8, thereby fully enclosing the locking mechanism. The tightening thrust is transmitted from the central body 4 to the skirt 10, then to the second coupling component 8 and from there to the case 3.

The spring 9 is preferably a flat wire wave compression spring. Such a spring has a very small space requirement and allows the plug to be made considerably lighter, in comparison with a similar plug provided with a helical compression spring.

The plug is assembled as follows: the elements are placed on the central body via its rear end, situated on the side of the recess or rotary drive configuration 6. The first component 7 is installed first, around the central body 4. The spring 9 is then installed around the central body and applied against the first component 7. The protective skirt 10 is then press-fitted or crimped around the central body and said components 7, 9. The skirt 10 provides protection at the same time, by constituting the outer casing of the plug, and the rotary coupling (or drive) between the central body 4 and the first component 7.

It is noted that the first component and the second component have very compact external shapes, particularly in the direction of the longitudinal axis X. Their thickness in this direction, the tubular extension 64 being excluded, can be less than 10-15 mm. For example, the first component can have a thickness comprised between 5 and 10 mm. These examples are in no way limitative. The type of spring used, the compactness of the first and second components as well as the rotary drive means used between the first component and the skirt give the plug a particularly reduced weight and space requirement that are able to satisfy very exacting demands.

FIGS. 6 and 7 illustrate a method according to the present invention of force-fitting the second coupling component 8 within the threaded hole 2 by use of a force-fitting means which in the example shown is a tool 70 having a threaded shaft 71 adapted to be secured in the thread 67 of the threaded hole 2, and a widened head 73 provided with a rotary drive formation 76 for a hand actuated or motor actuated wrench or like apparatus. The head 73 is provided with a thrust face 72 adapted to engage the bearing zone 13 of the second coupling component 8 while the threaded shaft 71 extends in an axially slidable and rotatable fashion through the bore of the tubular extension 64. An annular recess 74 is provided in the head 73 radially inwardly of the thrust face 72 thereby to accommodate the teeth 58 of the second coupling component 8 while the thrust face 72 engages the bearing zone 13.

The method of inserting the second coupling component 8 comprises: aligning the second coupling component 8 with the threaded hole 2;

inserting the threaded shaft 71 axially through the second coupling component 8 until the shaft thread begins to engage the thread 67, rotating the tool 70 thereby to screw the threaded shaft 71 into the threaded hole 2 until the thrust face 72 abuts the bearing zone 13 of the second coupling component 8;

going on screwing thereby to urge the tubular extension 64 into a force-fitted relationship within the hole mouth 66 until the rear face 63 of the second coupling component 8 abuts the case 2 as shown in FIG. 7; and unscrewing and withdrawing the tool 70.

In an alternative implementation of the method (which could be illustrated by FIG. 6), instead of using a specific tool, the plug 1 itself is used as the force-fitting means, in the same way as just described for the tool. The central body 4 of the plug and the annular end face 12 of the skirt 10 then operate as the threaded shaft 71 and the thrust face 72 of the tool, respectively.

In order to allow mutual engagement of the threads before beginning of the force-fitting proper, the axial length L (FIG. 6) between the thrust face 72 (or the end-face 12 of the skirt 10 if the plug 1 is used as the force-fitting means) and the free end of shaft thread (or of the central body thread) is greater than the sum of the axial length L8 of the second coupling component measured from its bearing zone 13 to the free end of the tubular extension and of the axial depth D2 of the hole-mouth, measured from the planar case face 65 to the beginning of the thread 67 of the threaded hole 2: $L > (L8 + D2)$.

With reference to FIGS. 8-10, a second embodiment of the invention will now be described, but only to the extent that it differs from the first embodiment previously described. The same reference numerals are used for substantially or fully identical elements, and sometimes for similar elements.

In this embodiment, the threaded hole 2 is of the type equipped with a clutch formation 81 within the hole-mouth 66. More specifically the clutch formation 81 is provided as an inner lateral wall of the threaded hole, with the thread 67 extending beyond the clutch formation 81 with respect to the screwing direction. In the illustrated embodiment the clutch formation 81 belongs to a tubular insert 82 fixedly secured, more particularly force-fitted, within the widened hole-mouth 66 of the threaded hole 2. In an embodiment, the clutch formation 81 consists of axial splines having inclined side faces.

A first alternative for implementing the present invention consists in removing the insert 82, e.g. with a screw-driver used for engaging the rear edge of the insert and then urging the insert axially outwardly, and implementing the just described first embodiment of the present invention.

In the second embodiment however, the insert 82 is kept in place. The second coupling component 88 now belongs to the plug 1 by being positioned axially between the first coupling component 7 and the axial stop 48. Apart from when locked by the first coupling component 7, the second coupling component 88 is rotatable and slidable with respect to the central body 4 and the skirt 10. Instead of being a smooth cylinder, the outer lateral face of the tubular extension 84 of the second coupling component 88 is provided with a clutch formation 85 (FIG. 10) adapted to mesh with the clutch formation 81 of the threaded hole 2, here of the insert 82.

In use, starting from the separated condition, i.e. the condition in which the plug is apart from the threaded hole, the thread on the central body 4 is being threadingly engaged into the thread of the threaded hole. At the beginning, the tubular extension 84 is axially apart from the clutch formation 81 of the threaded hole. At a certain stage, the clutch formation 85 of the tubular extension 84 engages the clutch formation 81 of the threaded hole, this resulting in a mutual clutching of both clutch formations, and consequently the second coupling component 88 becomes prevented from turning with the plug being rotated for screwing. Further rotation of the plug 1 is nevertheless possible thanks to an axial reciprocation of the first coupling component 7 axially biased by the resilient return means 9 as explained with respect to the first embodiment.

The clutch formations, in this embodiment axial splines, are of a kind allowing mutual axial displacement, therefore the second coupling component accompanies the axial displacement of the plug during screwing while being prevented from rotating as discussed above.

The tightened condition is reached when the end face 12 of the skirt 10 abuts the bearing zone 13 of the second coupling component, which itself rests onto the case around the threaded hole, and in this embodiment having an insert 82, around the insert 82. In this manner the tightening thrust is transmitted from the skirt to the second coupling component 88 and from there to the case 3, without any frictional engagement of the case since the second coupling component and the case are clutched together when the tightening thrust is applied.

With reference to FIG. 11-15, a third embodiment of the invention will now be described, but only to the extent that it differs from the second embodiment previously described.

In the third embodiment the first and the second components for releasable coupling 97, 98 and the resilient return means 9 are mountable onto the central body 4 by insertion of the distal end 34, remote from the skirt 10 and close to the screw thread 5 of the central body 4, through the central bores of the return means 9 and of the first and second coupling components 97, 98, in a manner which will be described later. This allows the skirt 10 and the central body 4 to be obtained from a single piece of metal, as shown, while the inner diameter of the skirt 10 is greater than the outer diameters of the return means 9 and of the first and second coupling components 97, 98. Thanks to this arrangement, the plug 1 is structurally stronger and yet more compact.

The bore of the second coupling component 98 is provided with a radially inwardly protruding catch 39 which is axially captive between the distal stop 18 of the central body 4 and a proximal stop 38 also provided on the central body 4 and limiting axial travel of the catch 39 towards the skirt 10. In the illustrated example, the catch 39 is in the form of a plastically deformable lip which extends continuously around the axis X. Preferably both stops 18, 38 are provided by opposed annular shoulders or the central body 4, facing each other.

During mounting, once the return means 9 and the first and second coupling components 97, 98 have been slid over the central body 4 up to a point that the lip 39 is positioned beyond the distal stop 18, the catch 39 is displaced from an initial, radially retracted position (FIGS. 14 and 15) allowing this movement, into the radially protruding position shown in FIGS. 11 and 12, in which the catch 39 precludes extraction of the central body by abutting the distal stop 18 and precludes movement of the catch 39 towards proximal beyond the proximal stop 38, whereas the return means 9 and the first coupling component 97 have respective central holes sufficiently wide for movement beyond the proximal stop 38.

In the example, displacement of the catch from its retracted position into its protruding position is obtained by plastic bending of the catch 39 from an oblique position with respect to the axis X (FIGS. 14 and 15), into a substantially radial (or at least less oblique) orientation (FIGS. 11 and 12) in which its open diameter is smaller. Though bendable under sufficient force, the catch 39 is rigid enough to withstand the force of the return means 9 without noticeably bending when the return means urge the catch 39 into abutment against the distal stop 18.

According to an advantageous embodiment of the invention, the proximal stop 38 has a larger outer diameter than the open diameter of the catch 39 in the retracted position. There is accordingly a radius difference e (FIG. 15) between the outer radii of both stops 18, 38, and the radius of the aperture defined by the catch 39 in its retracted position is intermediate between both above-cited radii. Moreover, in its retracted position, the catch points obliquely towards the proximal stop 38. Thus, when the second coupling component 98 is being inserted over the central body 4 with the catch 39 in its retracted position (about to be reached in the right-hand part of FIG. 15), movement continues until the catch 39 abuts the proximal stop 38 (left-hand part of FIG. 15). Then an axial force is exerted on the second coupling component 98 with respect to the central body 4 to continue the insertion movement, thereby to cause displacement, i.e. plastic bending of the catch 39 into its protruding position.

Advantageously, the proximal stop 38 and the bearing zone 12 of the skirt 10 are axially positioned with respect to each other so that short after the catch 39 has reached its desired protruding position, the bearing zones 12, 13 of the second coupling component 98 and of the skirt 10 rigidly abut each other, thus preventing excessive deformation of the catch 39 (FIG. 11).

After such mounting has occurred and the catch 39 is in its protruding, retaining position, reverse movement of the central body 4 out of the return means 9, first component 97 and second component 98 is prevented because the catch 39 in its retaining position abuts the distal stop 18 (FIG. 11).

During tightening of the plug 1 (FIGS. 11 and 12) into the threaded hole (not shown), the second coupling component

98 initially in the position shown in FIG. 12 is progressively pushed back towards the skirt 10 until the catch 39 abuts the proximal stop 38. Then the catch 39 resiliently bends somewhat until both bearing zones 12, 13 abut each other (FIG. 11). In this situation, the second coupling component 98 fully closes the blind chamber 30 formed between the central body 4 and the skirt 10, in which the return means 9 and the first coupling component 97 are accommodated and, when the plug is tightened, protected from pollution and dirt.

The closure of the chamber 30 by the second coupling component 8 is obtained by the substantially tight annular contact between both bearing zones 12, 13 along an outer edge of the chamber 30, and the substantially tight annular contact between the catch 39 and the proximal stop 38 along an inner edge of the chamber 30.

In the embodiment as shown, the skirt 10 comprises a rotary drive configuration 6 for driving in rotation using a tool for screwing/unscrewing. The configuration 6 is formed at the centre of the skirt 10 along the longitudinal axis (X) of the skirt. In the example shown, the rotary drive configuration is a 4-sided female part intended to receive a corresponding 4-sided male wrench for screwing and unscrewing. The skirt 10 and the central body 4 are obtained from one and the same single piece of metal. This feature resulting in a very robust plug is rendered possible by the mounting of the coupling components and the return means by insertion of the free end of the central body 4 therethrough.

Of course, the invention is not limited to the embodiments previously described and comprises all the technical equivalents of the means presented.

In particular, it was stated previously that the invention relates to a sealing device comprising a borescope plug, said device being intended to close an appropriate hole through which access can be gained to the inside of the case. The device of the invention relates more generally to any sealing device comprising a plug such as described previously, whether or not said plug has other features or functionalities. For example such a sealing device according to the invention can of itself constitute a thermal sensor, a vibration sensor, a particle detector (chip detector) or any other detection means.

Moreover, the skirt 10 as described previously is for example rigid, i.e. cannot be deformed in compression along the longitudinal axis of screwing. The rigid skirt forms a brace supported on the bearing zone 13 of the second component 8. In another embodiment of the invention, the skirt can conversely be resilient, i.e. its structure configured to be capable of deformation at least in compression along the longitudinal axis of screwing. To this end, it can comprise pierced, slotted or folded zones allowing it to be deformed and to return to its original shape after the release of the compression forces. Such a resilient skirt further optimizes the safety of the system by increasing the resilient reserve during tightening. It also makes it possible to reduce the phenomena of seizing of the screw thread by limiting/calibrating the tightening force to a predetermined value.

Moreover, the stroke of the first component 7 inside the skirt 10 can be adapted according to need.

While the invention has been described in examples of a plug adapted to seal a threaded case hole, especially a borescope hole, it is intended that the invention is applicable to self-locking devices for releasably locking against unwanted unscrewing a first threaded element which is adapted to be screwed and tightened by screwing into a threaded hole of a second threaded element, and to connecting devices so-equipped, such as a threaded bolt adapted to be screwed and tightened onto a second element. Said second element may be a single element or may be an assembly, in the sense that it can comprise for example a first part with an unthreaded through-hole and a second part which is remote from the coupling components and the bolt head and is provided with a screw thread flush with the unthreaded through-hole, whereby screwing of the bolt tightens both parts against each other while the self-locking device according to the invention secures the bolt against unwanted unscrewing.

Further aspects of a sealing device and a method of producing a sealing device in accordance with the present disclosure are described with reference to the following numbered clauses:

A sealing device comprising a plug intended to be placed in a threaded hole in a case, or removed therefrom, respectively by screwing and unscrewing, the sealing device comprising:

a central body of the plug, provided with a screw thread, a skirt rigidly connected to the central body and having an annular end-face capable of transmitting tightening thrust to the case, locking and unlocking means opposing spontaneous unscrewing of the plug, automatically activated by the rotation of the plug and its corresponding movement in the direction of screwing along a longitudinal axis, said locking and unlocking means comprising:

a first releasable coupling component coupled for common rotation with the central body via guide means configured on the periphery of the first component and extending radially with respect to said longitudinal axis, said guide means entering respectively corresponding grooves configured inside the skirt, which extend parallel to the longitudinal axis so as to allow axial displacement of the first coupling component inside the skirt; and a second releasable coupling component in a position facing the first releasable coupling component at least during screwing and unscrewing, wherein at least in the tightened condition of the plug the second coupling component is secured against rotation with respect to the case by rotation restricting means located inside the threaded bore, wherein in the screwed condition the annular end face of the skirt bears against a bearing face of the second releasable coupling component to transmit tightening thrust to the case.

The sealing device according to clause 1, wherein the guide means are constituted by at least two protrusions angularly distributed on the periphery of the first component, about the longitudinal axis, each protrusion being delimited, on the one hand radially by a cylindrical outer profile having a diameter greater than the generally cylindrical outer surface of the first component, and on the other hand angularly by longitudinal edges inscribed within planes forming an angular sector about the longitudinal axis.

The sealing device according to clause 2 or 3, wherein the angular sector has an angle comprised between 10 and 45 degrees.

The sealing device according to clause 2, wherein the radial height of the protrusions with respect to the longitudinal axis is greater than 1 mm.

The sealing device according to anyone of clauses 1-4, wherein the first coupling component and the second coupling component comprise respective sets of teeth intended to engage each other during screwing/unscrewing, said teeth having inclined lateral faces.

The sealing device according to anyone of clauses 1-5, wherein the central body comprises a rotary drive configuration for driving said plug in rotation using a tool for screwing/unscrewing.

The sealing device according to anyone of clauses 1-5, wherein the skirt comprises a rotary drive configuration for driving said plug in rotation using a tool for screwing/unscrewing.

The sealing device according to clause 7, wherein the skirt is extended beyond the central body on the side remote from the screw thread and defines the drive configuration inside the skirt beyond the central body.

The sealing device according to anyone of clauses 1-8, wherein said second coupling component comprises an annular body having a rear face adapted to rest against the case around the threaded hole, a front face provided with second coupling formations and with said annular bearing face for the free end of the skirt, said bearing face surrounding said second coupling formations.

The sealing device according to anyone of clauses 1-8, wherein said second coupling component comprises an annular body having a rear face adapted to rest against the case around the threaded hole, and a tubular extension provided radially inside said rear face and projecting beyond the rear face, said tubular extension being adapted for insertion within a widened hole-mouth of the threaded hole for rotation restricting cooperation therein.

The sealing device according to anyone of clauses 1-10, comprising resilient return means provided within the skirt and urging the first coupling component axially towards outside the skirt, and towards the second coupling component at least when the central body of the plug threadingly engages the threaded hole.

The sealing device according to clause 11, wherein the resilient return means are constituted by a flat wire wave compression spring.

The sealing device according to clause 11 or 12, wherein the central body comprises an axial stop against which the first coupling component abuts at a distal extremity of a stroke of said first component, under the force of the resilient return means.

The sealing device according to clause 13, wherein the axial stop is constituted by a collar machined on the central body.

The sealing device according to clause 13 or 14, wherein the first coupling component has a front face provided with first coupling formations surrounding an annular recess adapted to accommodate the distal axial stop when the first coupling component abuts the distal axial stop.

The sealing device according to clause 10, wherein the rotation restricting cooperation is a force-fitting of the tubular extension within the widened hole-mouth.

The sealing device according to anyone of clauses 1-14, wherein the rotation restricting means are means securing a tubular extension of the second coupling component within a widened hole-mouth of the threaded hole.

The sealing device according to clause 17, wherein the tubular extension is force-fitted within the widened hole-mouth.

The sealing device according to anyone of clauses 16-18, wherein said second coupling component comprises an annular body having a front face provided with second coupling formations surrounding an annular recess adapted to accommodate a distal axial stop of the central body when the plug is in the tightened condition, said distal axial stop being adapted to limit a stroke of the first coupling component towards outside the skirt.

The sealing device according to anyone of clauses 1-14, wherein said
second releasable coupling component is captive on the central body,
wherein said threaded hole is provided with a widened hole-mouth having as said rotation restricting means an inner side-wall provided with peripherally distributed hole-mouth clutch formations, and
wherein said second coupling component has a tubular extension with an outer peripheral wall provided with extension clutch formations complementary of said hole-mouth clutch formations, said tubular extension adapted to penetrate said hole-mouth with mutual clutching of said clutch formations thereby to clutch said second coupling component against rotation with respect to said case at least when said plug is in the tightened condition in the threaded hole.

The sealing device according to clause 20, wherein the hole-mouth clutch formations belong to an annular insert which is secured in the hole-mouth of the threaded hole, said threaded hole being threaded beyond said hole-mouth with respect to the screwing direction.

The sealing device according to clause 21, wherein in the tightened condition the second releasable coupling component bears against the case radially beyond the annular insert to transmit tightening thrust from the skirt to the case.

The sealing device according to anyone of clauses 20-22, wherein the central body comprises a distal axial stop against which the second component abuts at a distal extremity of a stroke of said second component, under the force of the first component being resiliently biased in the axial direction towards outside the skirt.

The sealing device according to anyone of clauses 20-23, wherein the second coupling component has a central bore provided with a catch and is mounted by an insertion of said screw thread through said bore followed by a displacement of said catch into a retaining position in which said catch precludes reverse movement of said screw thread out of said bore.

The sealing device according to clause 24, wherein said catch is a plastically deformable lip.

The sealing device according to clause 24 or 25, wherein said displacement of said catch is produced on termination of said insertion by an abutment of said catch against a proximal stop which is fast with said central body.

The sealing device according to clause 26, wherein said displacement of said catch is limited by said second coupling component abutting said annular end-face of said skirt.

The sealing device according to anyone of clauses 24-27, wherein an annular chamber is formed between said skirt and said central body and encloses said first coupling component and resilient return means urging said first coupling component towards said second coupling component, and wherein said second coupling component sealingly closes said chamber when said catch abuts said proximal stop along an annular abutment line and said annular end face abuts said bearing zone of the second coupling component along an annular bearing line.

The sealing device according to anyone of clauses 24-28, wherein said central body and said skirt are obtained from a single piece of metal.

The sealing device according to anyone of clauses 20-23, wherein when the annular end face of the skirt abuts the bearing zone of the second coupling component, an annular yieldable portion of the second coupling component abuts a proximal stop of the central body.

The sealing device according to clause 30, wherein said yieldable portion is a deformable annular lip formed on a bore of the second coupling component.

The sealing component according to clause 31, wherein an annular chamber is formed between said skirt and said central body and encloses said first coupling component and resilient return means urging said first coupling component towards said second component, and wherein said second coupling component sealingly closes said chamber when said yieldable portion abuts said proximal stop along an annular abutment line and said annular end-face of the skirt abuts the bearing zone of the second coupling component along an annular bearing line.

A method of producing a sealing device comprising a plug intended to be placed in a threaded hole in a case, or removed therefrom, respectively by screwing and unscrewing, the threaded hole being provided with a widened hole-mouth with a thread of the threaded hole being provided beyond the hole-mouth with respect to the screwing direction, the plug comprising:

a central body provided with a screw thread, a skirt rigidly connected to the central body and having an annular end face capable of transmitting tightening thrust to the case, a first releasable coupling component provided with first coupling formations and coupled for common rotation with the central body and axial displacement with respect to the central body, the method comprising the step of force-fitting in the hole-mouth a second coupling component provided with second coupling formations complementary of the first coupling formations, by exerting an axial thrust on a bearing zone provided on the second coupling component radially outside the second coupling formations, by use of a force-fitting means threadingly engaging the thread of the threaded hole.

The method of clause 33, wherein said force-fitting means is the plug with the annular end face of its skirt engaging the bearing zone of the second coupling component.

The method of clause 33, wherein said force-fitting means is a tool having a threaded shaft for engaging the thread of the threaded hole, a head having a thrust face for engaging said bearing zone of the second coupling component, and a rotary drive formation for being driven in rotation by a rotary drive means.

The method of clause 35, wherein the tool has an annular recess radially inside the thrust face to accommodate the second coupling formations while the thrust face bears on the bearing zone of the second coupling component.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A sealing device comprising a plug intended to be placed in a threaded hole in a case, or removed therefrom, respectively by screwing and unscrewing, the sealing device comprising:

a central body of the plug, provided with a screw thread, a skirt rigidly connected to the central body and having an annular end-face capable of transmitting tightening thrust to the case, locking and unlocking means opposing spontaneous unscrewing of the plug, automatically activated by the rotation of the plug and its corresponding movement in the direction of screwing along a longitudinal axis, said locking and unlocking means comprising:

a first releasable coupling component coupled for common rotation with the central body via guide means configured on the periphery of the first component and extending radially with respect to said longitudinal axis, said guide means entering respectively corresponding grooves configured inside the skirt, which extend parallel to the longitudinal axis so as to allow axial displacement of the first coupling component inside the skirt; and a second releasable coupling component in a position facing the first releasable coupling component at least during screwing and unscrewing, wherein at least in the tightened condition of the plug the second coupling component is secured against rotation with respect to the case by rotation restricting means located inside the threaded hole, wherein in the screwed condition the annular end face of the skirt bears against a bearing face of the second releasable coupling component to transmit tightening thrust to the case.

2. The sealing device according to claim 1, wherein the guide means are constituted by at least two protrusions angularly distributed on the periphery of the first component, about the longitudinal axis, each protrusion being delimited, on the one hand radially by a cylindrical outer profile having a diameter greater than the generally cylindrical outer surface of the first component, and on the other hand angularly by longitudinal edges inscribed within planes forming an angular sector about the longitudinal axis.

3. The sealing device according to claim 2, wherein the angular sector has an angle comprised between 10 and 45 degrees.

4. The sealing device according to claim 2, wherein the radial height of the protrusions with respect to the longitudinal axis is greater than 1 mm.

5. The sealing device according to claim 1, wherein the first coupling component and the second coupling component comprise respective sets of teeth intended to engage each other during screwing/unscrewing, said teeth having inclined lateral faces.

6. The sealing device according to claim 1, wherein the central body comprises a rotary drive configuration for driving said plug in rotation using a tool for screwing/unscrewing.

7. The sealing device according to claim 1, wherein the skirt comprises a rotary drive configuration for driving said plug in rotation using a tool for screwing/unscrewing.

8. The sealing device according to claim 7, wherein the skirt is extended beyond the central body on the side remote from the screw thread and defines the drive configuration inside the skirt beyond the central body.

9. The sealing device according to claim 1, wherein said second coupling component comprises an annular body having a rear face adapted to rest against the case around the threaded hole, a front face provided with second coupling formations and with said annular bearing face for the free end of the skirt, said bearing face surrounding said second coupling formations.

10. The sealing device according to claim 1, wherein said second coupling component comprises an annular body having a rear face adapted to rest against the case around the threaded hole, and a tubular extension provided radially inside said rear face and projecting beyond the rear face, said tubular extension being adapted for insertion within a widened hole-mouth of the threaded hole for rotation restricting cooperation therein.

11. The sealing device according to claim 10, wherein the rotation restricting cooperation is a force-fitting of the tubular extension within the widened hole-mouth.

12. The sealing device according to claim 11, wherein said second coupling component comprises an annular body having a front face provided with second coupling formations surrounding an annular recess adapted to accommodate a distal axial stop of the central body when the plug is in the tightened condition, said distal axial stop being adapted to limit a stroke of the first coupling component towards outside the skirt.

13. The sealing device according to claim 1, comprising resilient return means provided within the skirt and urging the first coupling component axially towards outside the skirt, and towards the second coupling component at least when the central body of the plug threadingly engages the threaded hole.

14. The sealing device according to claim 13, wherein the resilient return means are constituted by a flat wire wave compression spring.

15. The sealing device according to claim 13, wherein the central body comprises an axial stop against which the first coupling component abuts at a distal extremity of a stroke of said first component, under the force of the resilient return means.

16. The sealing device according to claim 15, wherein the axial stop is constituted by a collar machined on the central body.

17. The sealing device according to claim 15, wherein the first coupling component has a front face provided with first coupling formations surrounding an annular recess adapted to accommodate the distal axial stop when the first coupling component abuts the distal axial stop.

18. The sealing device according to claim 1, wherein the rotation restricting means are means securing a tubular extension of the second coupling component within a widened hole-mouth of the threaded hole.

19. The sealing device according to claim 18, wherein the tubular extension is force-fitted within the widened hole-mouth.

20. The sealing device according to claim 1, wherein said
second releasable coupling component is captive on the central body,
wherein said threaded hole is provided with a widened hole-mouth having as said rotation restricting means an inner side-wall provided with peripherally distributed hole-mouth clutch formations,
and wherein said second coupling component has a tubular extension with an outer peripheral wall provided with extension clutch formations complementary of said hole-mouth clutch formations, said tubular extension adapted to penetrate said hole-mouth with mutual clutching of said clutch formations thereby to clutch said second coupling component against rotation with respect to said case at least when said plug is in the tightened condition in the threaded hole.

21. The sealing device according to claim 20, wherein the hole-mouth clutch formations belong to an annular insert which is secured in the hole-mouth of the threaded hole, said threaded hole being threaded beyond said hole-mouth with respect to the screwing direction.

22. The sealing device according to claim 21, wherein in the tightened condition the second releasable coupling component bears against the case radially beyond the annular insert to transmit tightening thrust from the skirt to the case.

23. The sealing device according to claim 20, wherein the central body comprises a distal axial stop against which the second component abuts at a distal extremity of a stroke of said second component, under the force of the first component being resiliently biased in the axial direction towards outside the skirt.

24. The sealing device according to claim 20, wherein the second coupling component has a central bore provided with a catch and is mounted by an insertion of said screw thread through said bore followed by a displacement of said catch into a retaining position in which said catch precludes reverse movement of said screw thread out of said bore.

25. The sealing device according to claim 24, wherein said catch is a plastically deformable lip.

26. The sealing device according to claim 24, wherein said displacement of said catch is produced on termination of said insertion by an abutment of said catch against a proximal stop which is fast with said central body.

27. The sealing device according to claim 26, wherein said displacement of said catch is limited by said second coupling component abutting said annular end-face of said skirt.

28. The sealing device according to claim 24, wherein an annular chamber is formed between said skirt and said central body and encloses said first coupling component and resilient return means urging said first coupling component towards said second coupling component, and wherein said second coupling component sealingly closes said chamber when said catch abuts said proximal stop along an annular abutment line and said annular end face abuts said bearing zone of the second coupling component along an annular bearing line.

29. The sealing device according to claim 24, wherein said central body and said skirt are obtained from a single piece of metal.

30. The sealing device according to claim 20, wherein when the annular end face of the skirt abuts the bearing zone of the second coupling component, an annular yieldable portion of the second coupling component abuts a proximal stop of the central body.

31. The sealing device according to claim 30, wherein said yieldable portion is a deformable annular lip formed on a bore of the second coupling component.

32. The sealing component according to claim 31, wherein an annular chamber is formed between said skirt and said central body and encloses said first coupling component and resilient return means urging said first coupling component towards said second component, and wherein said second coupling component sealingly closes said chamber when said yieldable portion abuts said proximal stop along an annular abutment line and said annular end-face of the skirt abuts the bearing zone of the second coupling component along an annular bearing line.

* * * * *